No. 640,453. Patented Jan. 2, 1900.
J. C. DEVERS.
PLATE OR PAN HOLDER OR LIFTER.
(Application filed May 13, 1899.)
(No Model.)
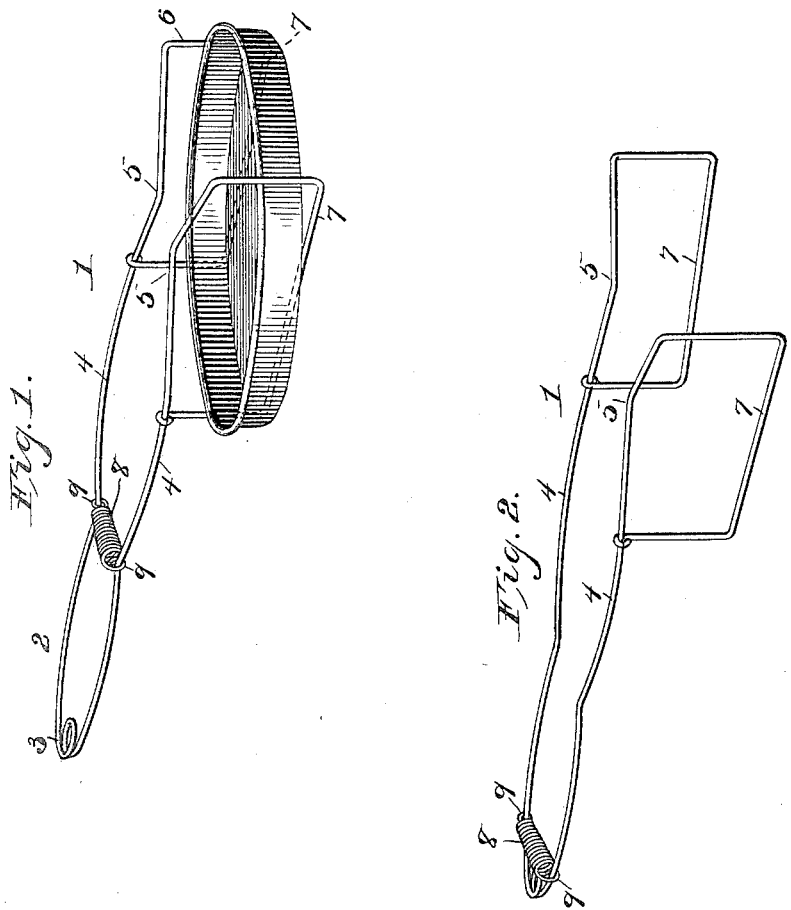
WITNESSES
Louis D. Heinrichs.
Chas. S. Hyer
INVENTOR
John C. Devers
By Victor J. Evans.
Attorney

UNITED STATES PATENT OFFICE.

JOHN C. DEVERS, OF WILKES-BARRÉ, PENNSYLVANIA.

PLATE OR PAN HOLDER OR LIFTER.

SPECIFICATION forming part of Letters Patent No. 640,453, dated January 2, 1900.

Application filed May 13, 1899. Serial No. 716,664. (No model.)

*To all whom it may concern:*

Be it known that I, JOHN C. DEVERS, a citizen of the United States, residing at Wilkes-Barré, in the county of Luzerne and State of Pennsylvania, have invented certain new and useful Improvements in Plate or Pan Holders or Lifters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to plate or pan lifters; and the object to be attained is to conveniently and readily lift heated plates or pans and transport them from one place to another by means of a device that is easily operated and can be applied without touching the plate or pan with the hands.

The invention essentially consists of a wire frame having a handle provided with outer entrant bends and lower holding-jaws, a spring-clasp being adjustably mounted on the handle and its resiliency serving to effect an easy adjustment and secure binding.

The invention further consists of the details of construction and arrangement of the several parts, which will be more fully hereinafter described and claimed.

In the accompanying drawings, Figure 1 is a perspective view of a plate or pan lifter embodying the invention and showing a pie-plate held thereby. Fig. 2 is a similar view of the improved device shown open.

Referring to the drawings, wherein similar numerals are employed to indicate corresponding parts in the views, the numeral 1 designates a wire-frame body having at one end a handle 2 with an end coil 3, which serves to spread the opposite parts of the frame apart when released in a manner which will be presently set forth. The handle is sufficiently long to afford a convenient grip, and from its front termination the frame is bowed or laterally bent, as at 4, and beyond said bowed or laterally-bent portions upper entrant bends 5 are formed, which provide inwardly-projecting keepers to prevent the plate or pan held by the device from becoming disengaged after a holding adjustment has been attained. Beyond the said entrant bends 5 the frame ends are bent downwardly, as at 6, then horizontally, and subsequently in a vertical direction and secured to the frame at about the front termination of the bowed or laterally-bent portions to form looped jaws 7, which are located directly under the entrant bends 5, and the horizontal portions thereof serve as base-rests for the plate or pan held by the device, and the opposite vertical bends limit the movement of the plate or pan in a horizontal direction at the front and rear.

On the handle 2 a spring-clasp 8 is adjustably mounted, and consists of a coil-spring having the opposite terminations bent into loops 9, movably fitted on the opposite members of the said handle. When the said spring-clasp is shoved toward the coil 3, as shown by Fig. 2, the jaws 7 separate by reason of the said coil, and the said jaws can be easily slipped under either side of a plate or pan and both jaws drawn together by moving the spring-clasp forwardly and cause the horizontal portions of the said jaws to bear against the bottom of the plate or pan. While the spring-clasp firmly holds the jaws 7 in close relation and bearing against different parts of the plate or pan, a sufficient flexibility is present to prevent injury or crushing of the plate or pan, if it be of metal, but at the same time no accidental disengagement can ensue. Furthermore, the clasp is self-adjustable and its tension will be consequently automatically varied in a transverse direction. After a pan has been lifted or transported by means of the improved device a disengagement can be readily had by moving the spring-clasp rearward, when the jaws will immediately fly apart and relieve the plate or pan holder from pressure.

The improved device is generally useful and will be found convenient in placing plates or pans in an oven or removing the same therefrom or in conveying cooking utensils to and from the top of a stove or range. It is preferred that the holder be made of a single piece of wire having an inherent resiliency and bent into the form set forth.

The device may be plated, if desired, and changes in the proportions and dimensions and minor details of construction can be resorted to without departing from the nature or spirit of the invention or sacrificing any of the advantages thereof.

Having thus described the invention, what is claimed as new is—

1. A plate or pan holder, comprising a frame having a handle with a coil at the end thereof, and outer jaws which are disposed below the greater part of the frame and over which are entrant bends, and a spring-clasp adjustably mounted on the said handle.

2. A plate or pan holder formed of a single piece of wire, and having a handle with an end coil, bowed or laterally-bent portions in advance of the handle, entrant bends in front of the bowed or laterally-bent portions, and lower jaws under the entrant bends, and a spring-clasp consisting of a coil-spring having opposite end loops adjustably embracing the opposite parts of the handle.

In testimony whereof I affix my signature in presence of two witnesses.

JOHN C. DEVERS.

Witnesses:
SAIDEE E. STANFORD,
GRACE D. WITTER.